(12) United States Patent
Brzuska et al.

(10) Patent No.: US 9,660,495 B2
(45) Date of Patent: May 23, 2017

(54) STATOR FOR A HIGH-TEMPERATURE ELECTRIC MOTOR AND ELECTRIC MOTOR

(71) Applicant: maxon motor ag, Sachseln (CH)

(72) Inventors: Yaaqub Brzuska, Luzern (CH); Kornelia Kunstmann, Hagendorn (CH); Pia Aschwanden, Arth (CH); Tobias Hänni, Luzern (CH); Bernd Hage, Sachseln (CH); Bernd Fürderer, Giswil (CH)

(73) Assignee: MAXON MOTOR AG, Sachseln (CH)

( * ) Notice: Subject to any disclaimer, the term of this patent is extended or adjusted under 35 U.S.C. 154(b) by 452 days.

(21) Appl. No.: 14/222,664

(22) Filed: Mar. 23, 2014

(65) Prior Publication Data
US 2014/0292115 A1    Oct. 2, 2014

(30) Foreign Application Priority Data

Mar. 27, 2013 (EP) ..................................... 13001589

(51) Int. Cl.
*H02K 15/12* (2006.01)
*H02K 3/28* (2006.01)
*H02K 3/38* (2006.01)

(52) U.S. Cl.
CPC ................. *H02K 3/28* (2013.01); *H02K 3/38* (2013.01); *H02K 2203/09* (2013.01)

(58) Field of Classification Search
CPC ......... H02K 3/28; H02K 3/38; H02K 2203/09

(Continued)

(56) References Cited

U.S. PATENT DOCUMENTS 3,151,260 A * 9/1964 MacCracken, Jr. ...... H02K 3/50
                                                            310/260
4,482,829 A * 11/1984 Tardieu ................... H02K 21/46
                                                            310/105

(Continued)

FOREIGN PATENT DOCUMENTS

DE    102004050374 A1    4/2006
DE    102008054529 A1    6/2010

(Continued)

OTHER PUBLICATIONS

English translation of DE 102008054529; Jun. 2010; Germany; Duerr et al.*

(Continued)

*Primary Examiner* — Michael Andrews
*Assistant Examiner* — Ahmed Elnakib
(74) *Attorney, Agent, or Firm* — Baker and Hostetler LLP

(57) ABSTRACT

A stator for an electric motor for use at very high temperatures of up to 550° C. is provided, comprising a stator winding with an axis and with several winding wire ends which are passed out at a front end of the stator winding. The stator further comprises a stator winding interconnection with several ring conductors which are arranged at the front end of the stator winding coaxially to same and are axially spaced apart from each other. The ring conductors serve the electrical contacting of the winding wire ends. It is provided that an electrically insulating distance ring is respectively provided between axially successive ring conductors, wherein the ring conductors and the distance rings are alternately stacked.

11 Claims, 5 Drawing Sheets

(58) Field of Classification Search
USPC .................. 310/45, 43, 71, 216.002; 29/596
See application file for complete search history.

(56) References Cited

U.S. PATENT DOCUMENTS

| | | | | |
|---|---|---|---|---|
| 4,852,245 | A * | 8/1989 | Denk | H02K 3/47 29/596 |
| 4,987,674 | A * | 1/1991 | Denk | H02K 3/47 29/596 |
| 5,196,752 | A * | 3/1993 | Palma | H02K 3/524 310/184 |
| 5,508,571 | A * | 4/1996 | Shafer, Jr. | H02K 3/28 310/179 |
| 6,949,848 | B2 * | 9/2005 | Yamada | H02K 3/522 29/596 |
| 2006/0097590 | A1 | 5/2006 | Schill | |
| 2009/0243408 | A1 | 10/2009 | Ueta et al. | |
| 2010/0148615 | A1 * | 6/2010 | Sasaki | H02K 3/522 310/180 |
| 2011/0012468 | A1 | 1/2011 | Horng et al. | |
| 2013/0049501 | A1 * | 2/2013 | Fujisaki | H02K 3/522 310/71 |
| 2013/0134809 | A1 * | 5/2013 | Phillips | H02K 3/30 310/71 |

FOREIGN PATENT DOCUMENTS

| | | |
|---|---|---|
| DE | 102010039335 A1 | 2/2012 |
| DE | 102011100843 A1 | 11/2012 |
| DE | 102011100863 A1 | 11/2012 |
| EP | 1168574 A2 | 1/2002 |
| EP | 1677404 A2 | 7/2006 |
| EP | 2135567 A1 | 12/2009 |
| EP | 2352220 A2 | 8/2011 |
| WO | 2010066491 A1 | 6/2010 |

OTHER PUBLICATIONS

English translation for DE 102008054529; Jun. 2010; Germany; Duerr et al.*

* cited by examiner

STATOR FOR A HIGH-TEMPERATURE ELECTRIC MOTOR AND ELECTRIC MOTOR

CROSS-REFERENCE TO RELATED APPLICATION

This application claims priority to foreign European Patent Application EP 13001589.4, filed on Mar. 27, 2013, the disclosure of which is incorporated herein by reference in its entirety.

FIELD OF THE INVENTION

The present invention relates to a stator for an electric motor according to the preamble of independent claim 1.

A stator of this type comprises a stator winding with an axis and with several winding wire ends passed out at a front end of the stator winding. The stator further comprises a stator winding interconnection with several ring conductors arranged at the front end of the stator winding coaxially to same and being axially spaced apart from each other. The ring conductors are provided to electrically contact the winding wire ends.

BACKGROUND

An electric motor with a stator winding interconnection comprising several ring conductors is known from DE 10 2004 050374 A1. The electric motor is configured as an inner rotor motor. The stator of the electric motor is a conventional slotted stator, consisting of a hollow-cylindrical iron core with several radially projecting teeth onto which the individual coils of the stator winding are wound. The stator is surrounded by a hollow-cylindrical housing into which the ring conductors of the stator winding interconnection, too, are inserted. The ring conductors are punched from copper sheet and each have an axially bent terminal lug for the external electrical contact. All ring conductors are arranged at a front end of the stator winding and inserted into the hollow-cylindrical housing of the electric motor. Various recesses, respectively, steps are formed in the inner wall of the housing which serve as stop for the ring conductors. The steps of the inner wall of the housing make sure that the ring conductors are held axially spaced apart from each other in the housing. Each winding wire end of the stator winding is soldered to one of the ring conductors.

The stator winding interconnection described in DE 10 2004 050374 A1 requires a specific configuration of the electric motor housing, thus necessitating a complicated manufacture of the housing. In addition, the motor cannot be set up without this specifically configured housing. To ensure that the individual ring conductors are sufficiently electrically insulated from each other a certain minimum distance plus a safety margin has to be provided between the axially, successively arranged ring conductors. Hence, the electric motor described in DE 10 2004 050374 A1 is relatively long in the axial direction.

DE 10 2011 100863 A1 and DE 10 2011 100843 A1 each disclose an electric motor having a stator winding interconnection which comprises several so-called rail parts configured in the form of annulus sections. Similar to the ring conductors according to DE 10 2004 050374 A1 the rail parts configured in the form of annulus sections are arranged to be axially spaced apart from each other at a front end of the stator winding and are each in electrical contact with a winding wire end of the stator winding. Each of the rail parts configured in the form of annulus sections comprises an axially projecting lug which serves for the external electrical contact. The rail parts are not only spaced apart from each other in the axial direction, but are also offset from each other in the circumferential direction. The stator winding and the rail parts arranged at the front end of the stator winding are encapsulated by an electrically insulating encapsulating material, while the axially bent lugs of the rail parts configured in the form of annulus sections project from the encapsulating material.

The manufacture of the electric motor described in DE 10 2011 100863 A1 and DE 10 2011 100843 A1 is relatively complicated as the rail parts configured in the form of annulus sections have to be spaced apart from each other with exact distances there between prior to encapsulating them, together with the stator winding, by the electrically insulating encapsulating material.

SUMMARY OF THE INVENTION

It is the object of the present invention to develop the stator of the generic type further in such a manner that the stator is particularly easy to manufacture and sufficiently stable for high-temperature applications.

The object is achieved by the features of independent claim 1. Accordingly, the object in connection with a stator of the generic type is achieved by the solution according to the invention if an electrically insulating distance ring is respectively provided between axially successive ring conductors, wherein the ring conductors and the distance rings are alternately stacked.

The invention has the advantage that the stator is extremely easy to manufacture. A special housing for positioning and retaining the individual ring conductors is not necessary. Also, the ring conductors need not be spaced apart from each other during the manufacture. The optimum distance between the ring conductors is automatically obtained by the distance rings arranged there between. The necessary distance between successive ring conductors can be exactly calculated on the basis of the material of the insulating distance rings. The distance rings are manufactured to this exactly calculated dimension so that, other than the stator winding interconnections known from the prior art, no additional safety margins, respectively, tolerance margins are necessary. The stator winding interconnection is, therefore, very compact in the axial direction, which ultimately leads to a compact construction of the electric motor as a whole. The insulating distance rings furthermore ensure a stable coherence so that the stator according to the invention is suited additionally and particularly for high-temperature applications. The ring conductors are made of metal, and are preferably made of copper. A particularly easy and inexpensive manufacture is realized if the ring conductors are punched out from sheet metal as sheet metal punchings.

Advantageous embodiments of the present invention are described in the dependent claims.

In a particularly preferred embodiment of the present invention the distance rings are made of ceramics. Insulating ceramic rings can be manufactured with utmost precision and have a very high stability, so that the stator according to the invention is predestined for high-temperature applications. Preferably, the ceramics is an oxide ceramics. With regard to the stability and the insulating properties zirconium oxide has proved to be a particularly suited material for the distance rings.

In another particularly preferred embodiment of the present invention the winding wire ends, the ring conductors and the distance rings are encapsulated by an insulating, curing encapsulating material. The curing encapsulating material connects the individual components to each other in a stable manner. Thus, an overall compact and stable construction is achieved. If the stator winding is configured as a hollow-cylindrical ironless stator winding the package produced by the encapsulating material between the ring conductors, the distance rings and the winding wire ends may serve as a winding support. Preferably, the insulating, curing encapsulating material is a ceramic adhesive which is suitable for adhesive-bonded joints of ceramics-to-ceramics and of ceramics-to-metal. The ceramic adhesive ensures a stable coherence even at very high operation temperatures of up to 550° C. Preferably, the encapsulating material encapsulates the ring conductors and the distance rings completely, while the terminal lugs of the ring conductors project out of the encapsulating material so that the external electrical contacting can be realized.

It is further preferred that the encapsulating material is radially limited by a ring sleeve, wherein the ring sleeve surrounds the ring conductors and the distance rings. The ring sleeve facilitates the encapsulation of the ring conductors and distance rings by the electrically insulating, curing encapsulating material. The ring sleeve allows an exact predetermination of the outer contour of the stator winding interconnection so that the stator winding, together with the stator winding interconnection, can be inserted later into an exactly adapted housing of the electric motor. Preferably, the ring sleeve, too, is made of ceramics, thus ensuring an extremely compact and stable coherence. If a ceramic adhesive is used as encapsulating material a very close bond between the ceramic ring sleeve and the encapsulating material is established. Preferably, the ring sleeve, too, is made of oxide ceramics, preferably zirconium ceramics.

In another preferred embodiment of the present invention the ring conductors each have at least one radially projecting lug for electrically contacting one of the winding wire ends. Thus, the electrical contacting between the winding wire ends and the ring conductors is significantly facilitated in the manufacture of the stator according to the invention. In particular, it is preferred that the ring conductors each have two lugs for electrically contacting two winding wire ends, wherein the two lugs of a ring conductor are arranged at different positions spaced apart from each other in the circumferential direction. Thus, a very space-saving and easy to realize interconnection of the individual coils of the stator winding is obtained.

In a particularly preferred embodiment of the present invention the lugs each have a recess substantially extending in the circumferential direction or tangentially. Thus, the electrical contacting of the winding wire ends is further facilitated. Even more preferably associated winding wire ends and recesses are arranged at the same radial distance to the axis, wherein the winding wire ends are passed through the recesses and bent to the associated lug. The stator winding can, in this case, be configured such that the winding wire ends are passed out axially at a front end of the stator winding in an easy manner. For the electrical contacting of the winding wire ends the ring conductors are placed onto the front end of the stator winding either individually, alternating with the distance rings arranged there between, or as a packet, so that the winding wire ends, viewed in the circumferential direction, are located between the lugs of the ring conductors. Subsequently, the ring conductors are turned around the axis of the stator winding so that the winding wire ends engage into the recesses of the lugs. The winding wire ends then merely have to be bent to the associated lug and fixed to the lug in an appropriate manner. Only after the electrical contacting of the winding wire ends are the ring conductors and the insulating distance rings encapsulated, together with the winding wire ends. The electrical contacting of the winding wire ends is particularly easy if all winding wire ends and recesses of the lugs are arranged on a circle and are, preferably, uniformly distributed over the circumference.

A particularly compact construction is obtained if the lugs of the ring conductors project radially outwardly. Thus, the electrical contacting of the winding wire ends, too, is further facilitated. Moreover, the ring conductors and the distance rings in this embodiment only have to be encapsulated with each other on the outside.

In another preferred embodiment of the present invention the winding wire ends are welded to the associated lugs. As opposed to other electrical connection techniques a welded connection is extremely temperature-stable and, therefore, well suited for high-temperature applications.

In another preferred embodiment of the present invention at least two of the ring conductors have an axially bent terminal lug for the external electrical contacting. The terminal lugs project out of the encapsulating material in an axial direction so that the external electrical contacting can also be realized subsequently. The number of the ring conductors that have to have an axially bent terminal lug depends on the number of the phase windings and the type of interconnection. Preferably, the stator winding is configured in three phases, wherein three of the ring conductors have an axially bent terminal lug.

In another particularly preferred embodiment of the present invention the stator comprises a winding support ring which is arranged between the stator winding and the stacked ring conductors and includes several bores through which the winding wire ends are passed. This embodiment is particularly suited for ironless hollow-cylindrical stator windings which are configured to be self-supporting and retained in the housing by the support ring. If the ring conductors, the distance rings and the winding wire ends are encapsulated by the encapsulating material the so created package may already serve as a winding support. The winding support ring even more significantly increases the stability of the stator according to the invention, however. The winding support ring is preferably configured as a substrate ring and is preferably made of ceramics. In this case, too, oxide ceramics are preferably used. It is particularly preferred if the support ring is made of zirconium oxide. To obtain a particularly stable coherence the winding support ring is also encapsulated, at least partially, with the encapsulating material at least on that front side that faces the stator winding interconnection. The winding support ring joins the above-mentioned ring sleeve preferably axially. It is furthermore preferred that the ring sleeve and the winding support ring are flush with each other also in the radial direction so that the stator can be easily inserted into a hollow-cylindrical housing.

In another preferred embodiment of the present invention the stator winding is supported in the radial direction by a supporting sleeve arranged inside the stator winding, wherein the supporting sleeve is inserted into an accommodating recess of the winding support ring. The supporting sleeve protects the rotor of the electric motor against impurities which may result from a heat development particularly in high-temperature applications. Such impurities are produced, for example, by melting or evaporating thermosetting varnish of the stator winding. In addition, the supporting sleeve increases the stability of the stator winding. Thus, even in high-temperature applications hollow-cylindrical ironless stator windings may be used which allow an extremely compact construction of the electric motor and, furthermore, ensure a high efficiency. Preferably, the supporting sleeve, too, is made of ceramics. Preferably, oxide ceramics are used, particularly preferred zirconium oxide.

In another preferred embodiment of the present invention the stator winding has three phase windings which are interconnected in a delta connection. It is also possible, however, that the stator winding only comprises two phase windings or more than three phase windings. Instead of a delta connection, for instance, a star connection is conceivable, too.

The invention further provides an electric motor comprising a stator according to the invention. The electric motor is suited for high-temperature applications at operation temperatures of up to 550° C. Preferably, the electric motor is configured as a small-power electric motor with a diameter in the range of 4 mm to 65 mm. The diameter of the small-power electric motor is particularly preferably between 16 mm and 40 mm. Possible fields of application for the electric motor according to the invention are aerospace, vehicle construction, aircraft construction, raw material extraction and processing, in particular in the oil industry for test drilling and prospect drilling for oil and natural gas, as well as power plant technology.

BRIEF DESCRIPTION OF THE DRAWINGS

An embodiment of the present invention will be explained in more detail below by means of drawings.

In the drawings.

DETAILED DESCRIPTION

In the description below like components will be designated with like reference numbers. If reference numbers are shown in an illustration which will not be referred to in the associated description of the figures, reference is made to preceding or following descriptions of figures.

Figure 1:
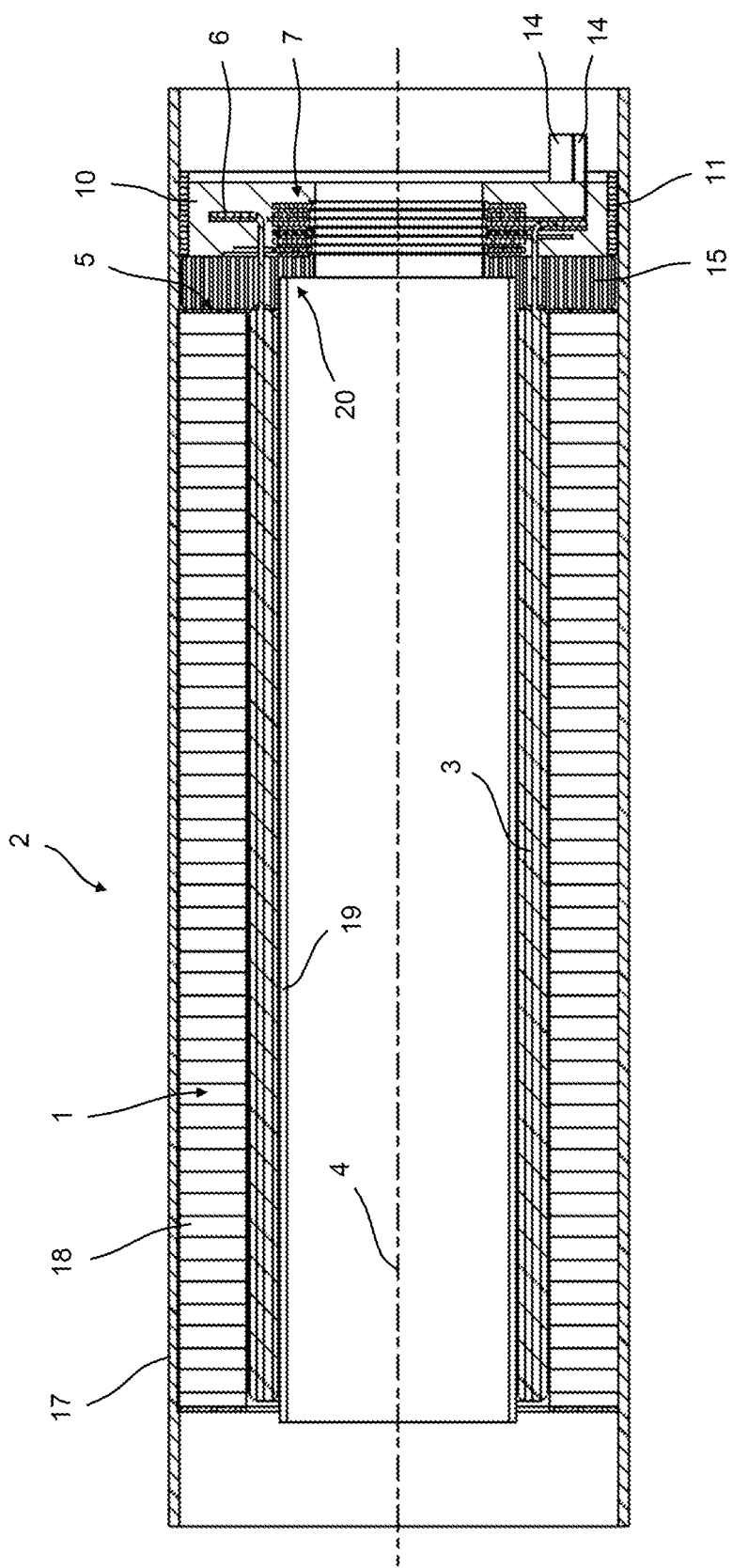
FIG. 1 shows a longitudinal section through an electric motor comprising a stator according to the invention.

FIG. 1 shows a longitudinal section through a small-power electric motor configured for high-temperature applications up to 550° C. Merely the housing 17 and the stator 1 of the electric motor 2 are illustrated. The rotor of the electric motor is not illustrated in the figure. The stator comprises a hollow-cylindrical ironless stator winding 3 which is surrounded by an equally hollow-cylindrically configured magnetic back yoke 18. The outer back yoke 18 is adjacent to the outer circumference of the ironless stator winding 3. The stator winding 3 and the back yoke 18 are, therefore, arranged coaxially to each other and have the common axis 4. The stator winding 3 is configured to be substantially self-supporting and, for example, wound from a thermosetting varnish wire. To increase the stability the stator winding 3 is supported by a supporting sleeve 19 arranged inside the stator winding. The supporting sleeve 19 is made of ceramics, preferably of zirconium oxide, and protects the non-illustrated rotor of the small-power electric motor against impurities. Moreover, the supporting sleeve 19 ensures that the stator winding maintains its shape even at very high operation temperatures. The housing 17 of the electric motor is formed by a hollow-cylindrical sleeve into which the stator 1 is inserted. At the right front end 5 of the stator winding 3 a winding support ring 15 is arranged by means of which the stator winding 3 is retained in the housing 17 of the electric motor. The winding support ring 15 is directly adjacent in the axial direction to the right front end 5 of the stator winding 3. The supporting sleeve 19 extends substantially over the total length of the stator winding and projects beyond the stator winding at the right front end 5 into a step-like accommodating recess 20 of the winding support ring. The supporting sleeve may be adhesively bonded, for example, to the winding support ring.

The winding support ring 15 is joined in the axial direction by a stator winding interconnection 7 by means of which the winding wire ends 6 of the stator winding 3 are suitably interconnected. The stator winding interconnection 7, together with the winding support ring 15, is illustrated in more detail in the following illustrations. FIG. 1 shows that that the stator winding interconnection 7 is surrounded by a ring sleeve 11 which likewise joins the winding support ring 15 in the axial direction and is flush with the winding support ring 15 in the radial direction. The stator winding interconnection 7 is encapsulated by an electrically insulating encapsulating material 10 made of a ceramic adhesive. The encapsulating material 10 permanently joins the components of the stator winding interconnection to the winding wire ends 6, the winding support ring 15 and the ring sleeve 11. The winding support ring 15 and the ring sleeve 11, like the supporting sleeve 19, are made of ceramics, preferably zirconium oxide.

Figure 2:
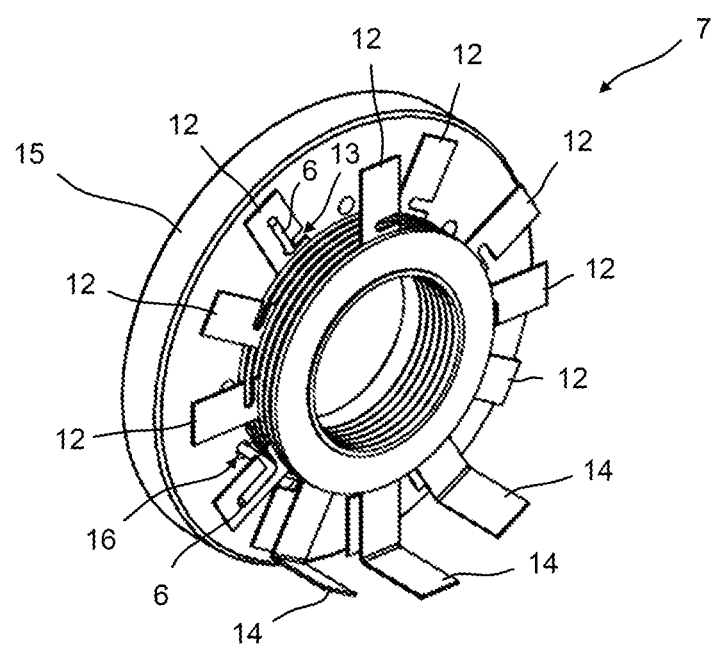
FIG. 2 shows a perspective detailed view of the stator winding interconnection of the stator according to the invention of FIG. 1.
Figure 3:
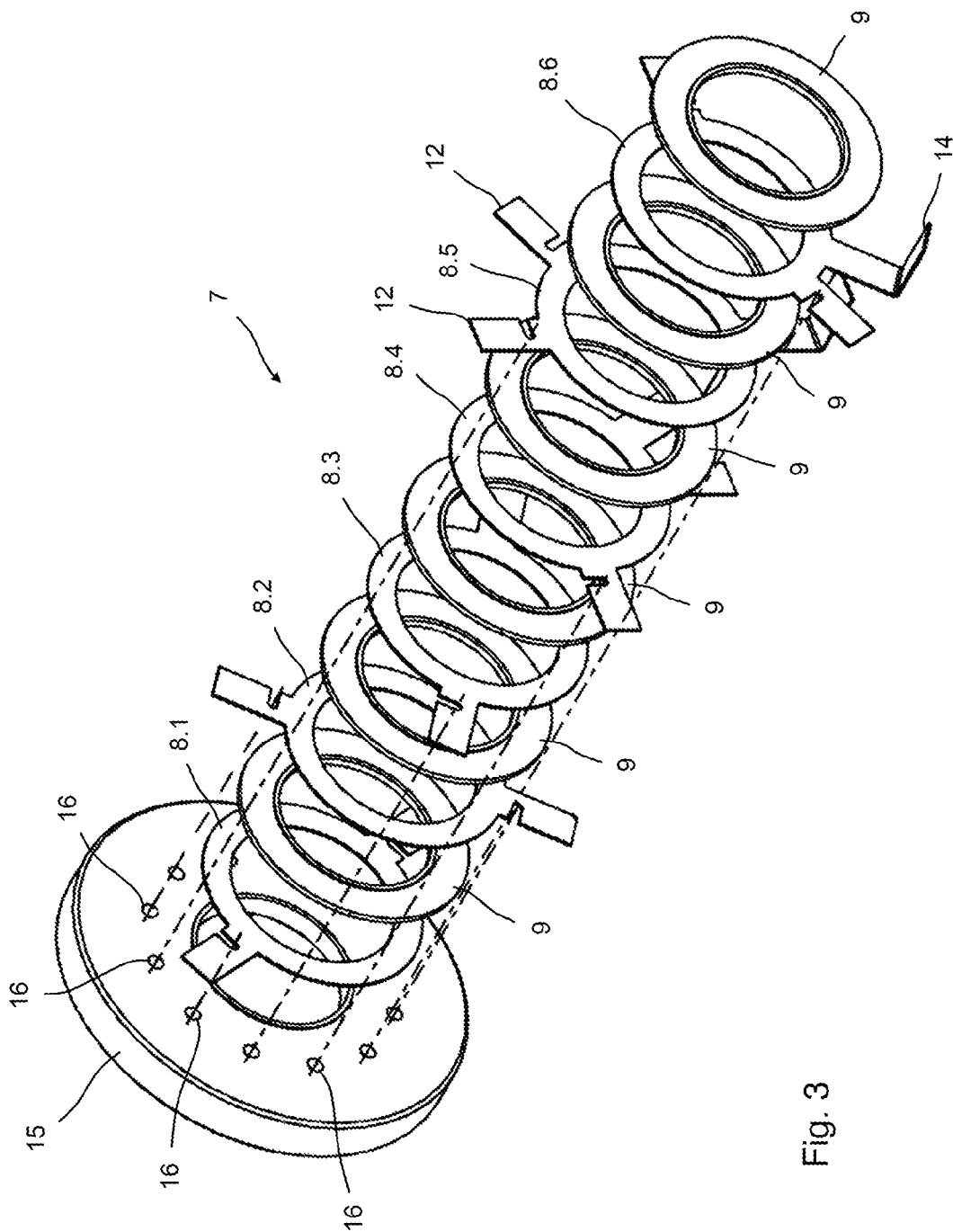
FIG. 3 shows an exploded view of the stator winding interconnection of FIG. 2.
Figure 4:
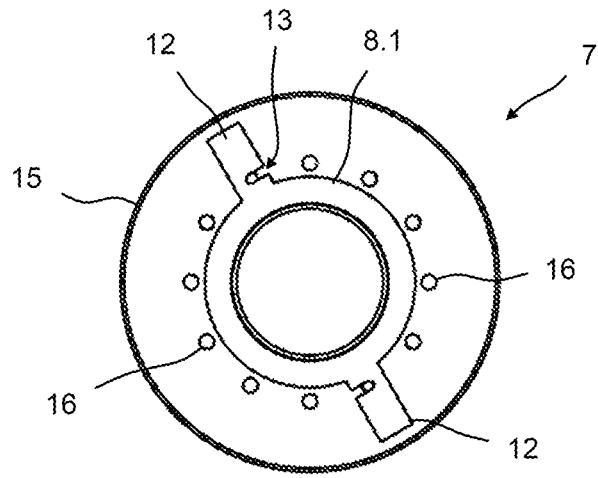
FIG. 4 shows a top view of the stator winding interconnection of FIGS. 2 and 3 in a first stage of the assembly.
Figure 5:
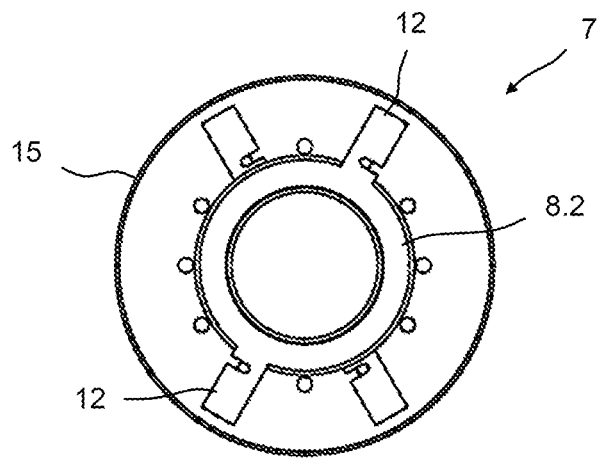
FIG. 5 shows the view of FIG. 4 in a second stage of the assembly.
Figure 6:
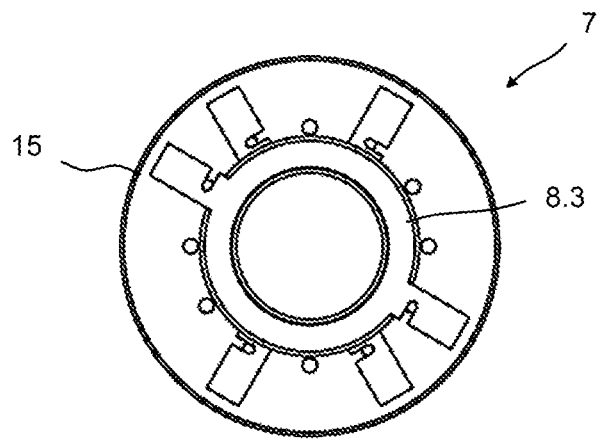
FIG. 6 shows the view of FIGS. 4 and 5 in a third stage of the assembly.
Figure 7:
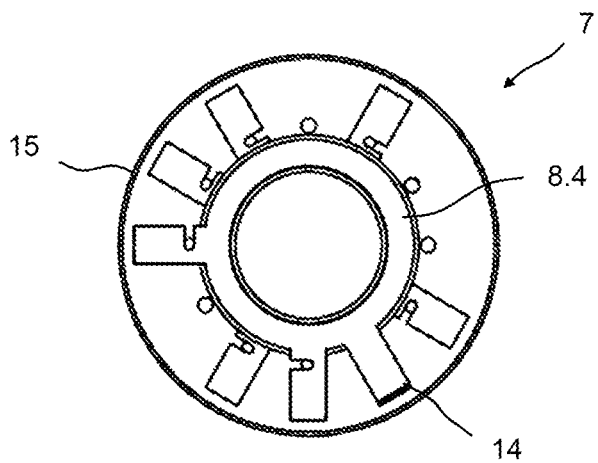
FIG. 7 shows the same view in a fourth stage of the assembly.
Figure 8:
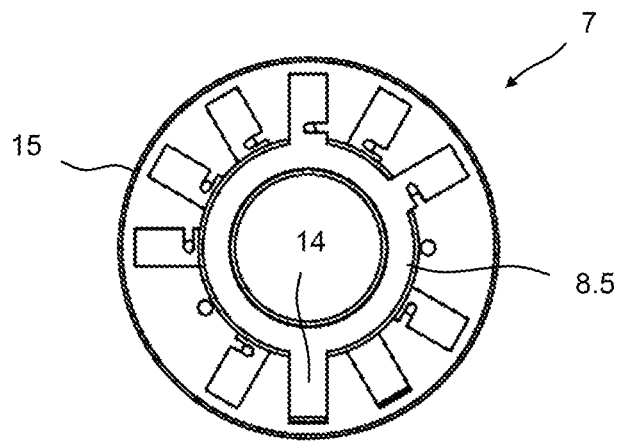
FIG. 8 shows the stator winding interconnection in a fifth stage of the assembly.
Figure 9:
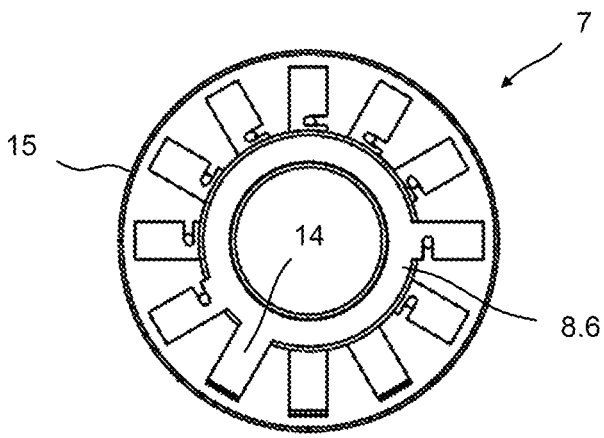
FIG. 9 shows a top view of the completed stator winding interconnection.

The stator winding interconnection 7 in FIG. 2 is shown in a perspective view. FIG. 3 shows an exploded view of the stator winding interconnection 7. It substantially consists of six ring conductors 8.1 to 8.6 stacked one on top of the other. The ring conductors 8 are copper rings punched from a copper sheet, which are arranged coaxially to the axis 4 of the electric motor. A distance ring 9 is respectively located between two successive ring conductors, which is also made of ceramics and electrically insulates the relevant ring conductors from each other. In order to produce the stator winding interconnection 7 the ring conductors 8.1 to 8.6 and the distance rings 9 are alternately stacked one on top of each other. FIGS. 4 to 9 show different stages of the stacking process. The first ring conductor 8.1 is directly adjacent to the winding support ring 15, which is made of ceramics, in the axial direction. Like the other ring conductors 8.2 to 8.6., it comprises two radially outwardly projecting lugs 12 for electrically contacting two winding wire ends 6. All winding wire ends 6 are passed through corresponding bores 16 of the winding support ring 15 in the axial direction. The lugs 12 of the ring conductors 8.1 to 8.6, viewed in the circumferential direction, are arranged such that they respectively come to lie on the position of one of the bores 16. Each of the lugs 12 has a recess 13 which substantially extends in the circumferential direction and is located directly above the corresponding bore 16 so that the winding wire ends can be passed through the recesses 13 and bent outwardly by 90° to the respective lug 12, as is shown by way of example in FIG. 2 for merely two of the winding wire ends 6. The winding wire ends 6 are welded to the associated lugs 12.

The outer three ring conductors 8.4, 8.5 and 8.6 each have, in addition to the two lugs 12, an axially bent terminal lug 14. The three terminal lugs 14 serve the external electrical contacting of the stator winding 3. Same comprises three phase windings which are interconnected by means of the stator winding interconnection 7 in a delta connection. The three terminal lugs 14 are the only electrically contactable parts of the stator winding interconnection that project out of the encapsulating material 10 shown in FIG. 1. The total structure of the stator, respectively, the stator winding interconnection is extremely compact and stable. Due to the ceramic components and the equally ceramic encapsulating material the stability is guaranteed also at very high operation temperatures of up to 550° C.

The invention claimed is:

1. A stator for an electric motor comprising:
a stator winding with an axis and with several winding wire ends which are passed out at a front end of the stator winding, wherein the stator comprises a stator winding interconnection with several ring conductors which are arranged at the front end of the stator winding coaxially to same and are axially spaced apart from each other, wherein the ring conductors serve the electrical contacting of the winding wire ends, and wherein an electrically insulating distance ring is respectively provided between axially successive ring conductors, and wherein the ring conductors and the distance rings are alternately stacked,
wherein the stator comprises a winding support ring, wherein the winding support ring is arranged between the stator winding and the stacked ring conductors and includes several bores through which the winding wire ends are passed,
wherein the stator winding is supported in the radial direction by a supporting sleeve arranged inside the stator winding, the supporting sleeve being inserted into an accommodating recess of the winding support ring,
wherein the winding support ring is directly adjacent, in an axial direction, to a front end of the stator winding on a first side of the winding support ring, and
wherein the stator winding interconnection is surrounded by a ring sleeve, and the ring sleeve is joined to the winding support ring on a second side of the winding support ring, opposite the first side.

2. The stator according to claim 1, wherein the ring conductors each have at least one radially projecting lug for electrically contacting one of the winding wire ends, and
wherein each of the radially projection lugs is located directly above a corresponding bore of the several bores of the winding support ring.

3. The stator according to claim 1, wherein the distance rings are made of ceramics.

4. The stator according to claim 1, wherein the winding wire ends, the ring conductors and the distance rings are encapsulated by an insulating, curing encapsulating material.

5. The stator according to claim 4, wherein the encapsulating material is radially limited by a ring sleeve, wherein the ring sleeve surrounds the ring conductors and the distance rings.

6. The stator according to claim 1, wherein the ring conductors each have two lugs for electrically contacting two winding wire ends, wherein the two lugs of a ring conductor are arranged at different positions spaced apart from each other in a circumferential direction.

7. The stator according to claim 6, wherein the lugs project radially outwardly.

8. The stator according to claim 1, wherein the winding wire ends are welded to associated lugs.

9. The stator according to claim 1, wherein at least two of the ring conductors have an axially bent terminal lug for external electrical contacting.

10. The stator according to claim 1, wherein the stator winding has three phase windings which are interconnected in a delta connection.

11. An electric motor comprising a stator according to claim 1.

* * * * *